United States Patent
Furusawa

(10) Patent No.: US 9,611,858 B2
(45) Date of Patent: Apr. 4, 2017

(54) WATER PUMP WITH REINFORCEMENT RIB

(71) Applicant: HITACHI AUTOMOTIVE SYSTEMS, LTD., Hitachinaka-shi, Ibaraki (JP)

(72) Inventor: Yusuke Furusawa, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 643 days.

(21) Appl. No.: 13/972,342

(22) Filed: Aug. 21, 2013

(65) Prior Publication Data

US 2014/0064931 A1 Mar. 6, 2014

(30) Foreign Application Priority Data

Aug. 29, 2012 (JP) ................. 2012-188240

(51) Int. Cl.
| | | |
|---|---|---|
| F04D 29/04 | (2006.01) | |
| F04D 13/02 | (2006.01) | |
| F04D 29/58 | (2006.01) | |
| F16H 55/36 | (2006.01) | |
| F16H 55/17 | (2006.01) | |

(52) U.S. Cl.
CPC ............ F04D 29/04 (2013.01); F04D 13/02 (2013.01); F04D 29/5806 (2013.01); F04D 29/588 (2013.01); F16H 55/171 (2013.01); F16H 55/36 (2013.01)

(58) Field of Classification Search
CPC .... F04D 29/026; F04D 29/043; F04D 29/049; F04D 29/04; F04D 1/00; F04D 13/02–13/022; F16H 55/36; F16H 55/40; F16H 55/48; F16H 55/49; Y10S 415/915

USPC .... 415/124.2, 170.1, 229, 915; 416/60, 174, 416/244 R; 417/362; 29/892–892.3; 474/152–199

See application file for complete search history.

(56) References Cited

U.S. PATENT DOCUMENTS

| | | | | |
|---|---|---|---|---|
| 6,200,089 B1 * | 3/2001 | Heer | ...................... | F04D 29/049 |
| | | | | 415/168.2 |
| 6,332,842 B1 * | 12/2001 | Tabuchi | ................... | F16D 9/06 |
| | | | | 403/11 |
| 6,764,278 B2 | 7/2004 | Ozawa et al. | | |
| 7,695,385 B2 * | 4/2010 | Barraud | ................. | F16C 19/06 |
| | | | | 384/484 |
| 7,993,228 B2 * | 8/2011 | Nosaka | ...................... | F16D 3/68 |
| | | | | 474/161 |
| 8,052,560 B2 * | 11/2011 | Nosaka | ...................... | F16D 3/68 |
| | | | | 474/178 |
| 8,342,808 B2 | 1/2013 | Ota et al. | | |
| 2002/0034438 A1 * | 3/2002 | Ozawa | .................. | F04D 29/049 |
| | | | | 415/111 |

(Continued)

FOREIGN PATENT DOCUMENTS

| | | | | |
|---|---|---|---|---|
| IT | WO 2013038432 A1 * | 3/2013 | ............ | D06F 37/30 |
| JP | 2002-349481 A | 12/2002 | | |

(Continued)

*Primary Examiner* — Thomas Denion
*Assistant Examiner* — Laert Dounis
(74) *Attorney, Agent, or Firm* — Foley & Lardner LLP

(57) ABSTRACT

In a water pump, a reinforcement rib is integrally installed on either an outer surface or an inner surface of a flange wall of a pulley and radially extended toward an outer direction from a center side at which one end section of a drive shaft is coupled.

13 Claims, 10 Drawing Sheets

(56) References Cited

U.S. PATENT DOCUMENTS

| | | | | |
|---|---|---|---|---|
| 2002/0176773 A1* | 11/2002 | Ozawa | ............... | F04D 29/026 |
| | | | | 415/124.2 |
| 2004/0074468 A1* | 4/2004 | Makino | ............... | F01C 21/008 |
| | | | | 123/196 R |
| 2006/0084541 A1* | 4/2006 | Nosaka | ............... | F16D 3/68 |
| | | | | 474/170 |
| 2007/0232427 A1* | 10/2007 | Ueno | ............... | F16H 55/48 |
| | | | | 474/199 |
| 2008/0161141 A1* | 7/2008 | Joo | ............... | F16H 55/48 |
| | | | | 474/8 |
| 2009/0258741 A1* | 10/2009 | Nosaka | ............... | F16D 3/68 |
| | | | | 474/178 |
| 2012/0134789 A1* | 5/2012 | Murakami | ............... | F04D 13/02 |
| | | | | 415/182.1 |

FOREIGN PATENT DOCUMENTS

| | | |
|---|---|---|
| JP | 2002-349481 A | 12/2002 |
| JP | 2007-009714 A | 1/2007 |
| JP | 2008-202693 A | 9/2008 |
| WO | WO-2008/072516 A1 | 6/2008 |

* cited by examiner

WATER PUMP WITH REINFORCEMENT RIB

BACKGROUND OF THE INVENTION (1) Field of the Invention

The present invention relates to a water pump used for supplying a coolant to cool, for example, an internal combustion engine to an inside of the internal combustion engine.

(2) Description of Related Art

A Japanese Patent Application First Publication No. 2002-349481 published on Dec. 4, 2002 which corresponds to a U.S. Pat. No. 6,764,278 issued on Jul. 20, 2004 exemplifies a previously proposed water pump. This previously proposed water pump includes: a pump housing having a pump chamber at an inner part thereof; a drive shaft made of a synthetic resin rotatably supported within the pump housing; a pulley made of the synthetic resin material rotatably supported within the pump housing; a pulley made of the synthetic resin material and integrally united to one end section of the drive shaft via a flange wall; a ball bearing installed via a cylindrical metallic insert on an inner peripheral side of the pulley; an impeller integrally rotatably installed on the other end section of the drive shaft; and a mechanical seal interposed between the impeller and the pulley.

SUMMARY OF THE INVENTION

Incidentally, in the water pump described above, a thermal shock test from an extremely high temperature to an extremely low temperature is carried out as one of checking means for previously checking a durability of each of parts such as the drive shaft and the pulley after a resin molding by means of an injection molding.

However, since an expansion rate between the pulley made of a synthetic resin material and a metallic insert is largely different from each other, a flange wall is expanded and shrunk when the thermal shock test is carried out. At this time, expansion and shrinkage in a diameter direction are suppressed by means of the metallic insert and residual stress would be generated on the flange wall. Consequently, there is a possibility of a generation of cracks on the flange wall.

It is, therefore, an object of the present invention to provide a water pump which is capable of suppressing cracks due to the expansion and shrinkage in the flange wall by providing a reinforcement rib on the flange wall.

According to one aspect of the present invention, there is provided with a water pump, comprising: a pump housing having a pump chamber at an inside thereof; a drive shaft rotatably supported within the pump housing; a pulley integrally coupled to one end section of the drive shaft via a flange wall and integrally formed on the drive shaft by means of a synthetic resin material; a cylindrical metallic member fixed to an inner periphery of a cylindrical section integrally formed on an outer periphery of the flange wall of the pulley; a bearing intervened between the metallic member and the pump housing to rotatably journal the drive shaft; an impeller housed within the pump chamber and rotatably installed together with the drive shaft on the other end section of the drive shaft; and a reinforcement rib integrally installed on at least an outer surface of the flange wall and radially extended toward an outer direction from a center side at which the one end section of the drive shaft is coupled.

According to another aspect of the present invention, thee is provided with a water pump, comprising: a pump housing having a pump chamber at an inside thereof; a drive shaft rotatably supported within the pump housing; a pulley integrally coupled to one end section of the drive shaft via a disc-shaped linkage wall and integrally formed on the drive shaft by means of a synthetic resin material; a cylindrical metallic member fixed onto a disc-shaped inner periphery of a cylindrical section integrally formed on an outer periphery of the linkage wall of the pulley; a bearing intervened between the metallic member and the pump housing to rotatably journal the drive shaft; an impeller housed within the pump chamber and rotatably installed together with the other end section of the drive shaft; and a reinforcement rib disposed on an outer surface of the linkage wall or an inner surface of the linkage wall and on an inner peripheral side of the cylindrical metallic member.

DETAILED DESCRIPTION OF THE INVENTION

First Embodiment

Each preferred embodiment of a water pump according to the present invention will be described with reference to the attached drawings. This water pump 1 is applicable to a cooling device by which an anti-freezing solution (ethylene glycol) is circulated which is a coolant between a radiator of an automotive vehicle and an internal combustion engine.

Figure 1:
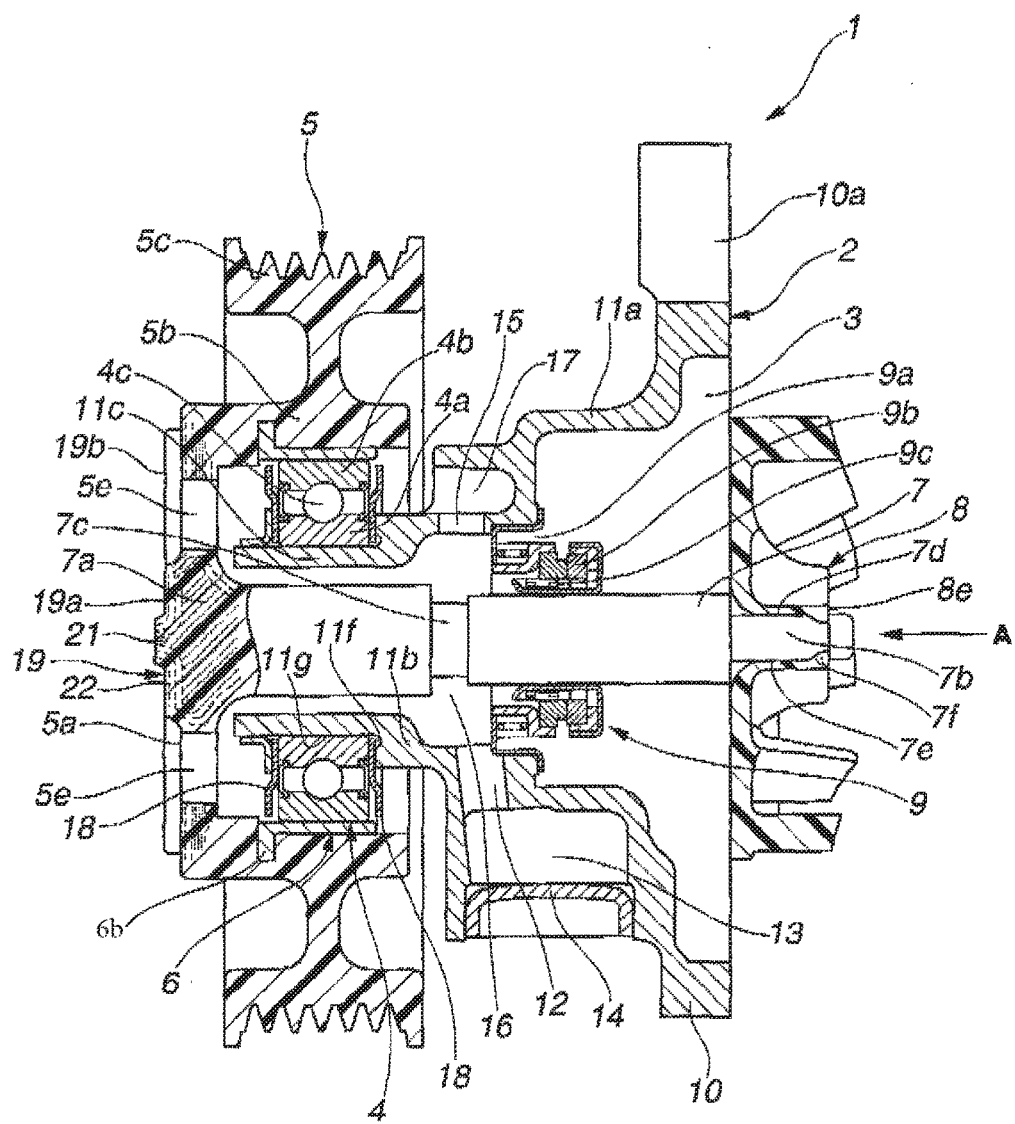
FIG. 1 is a longitudinal cross sectional view of a first preferred embodiment of a water pump according to the present invention.
Figure 2:
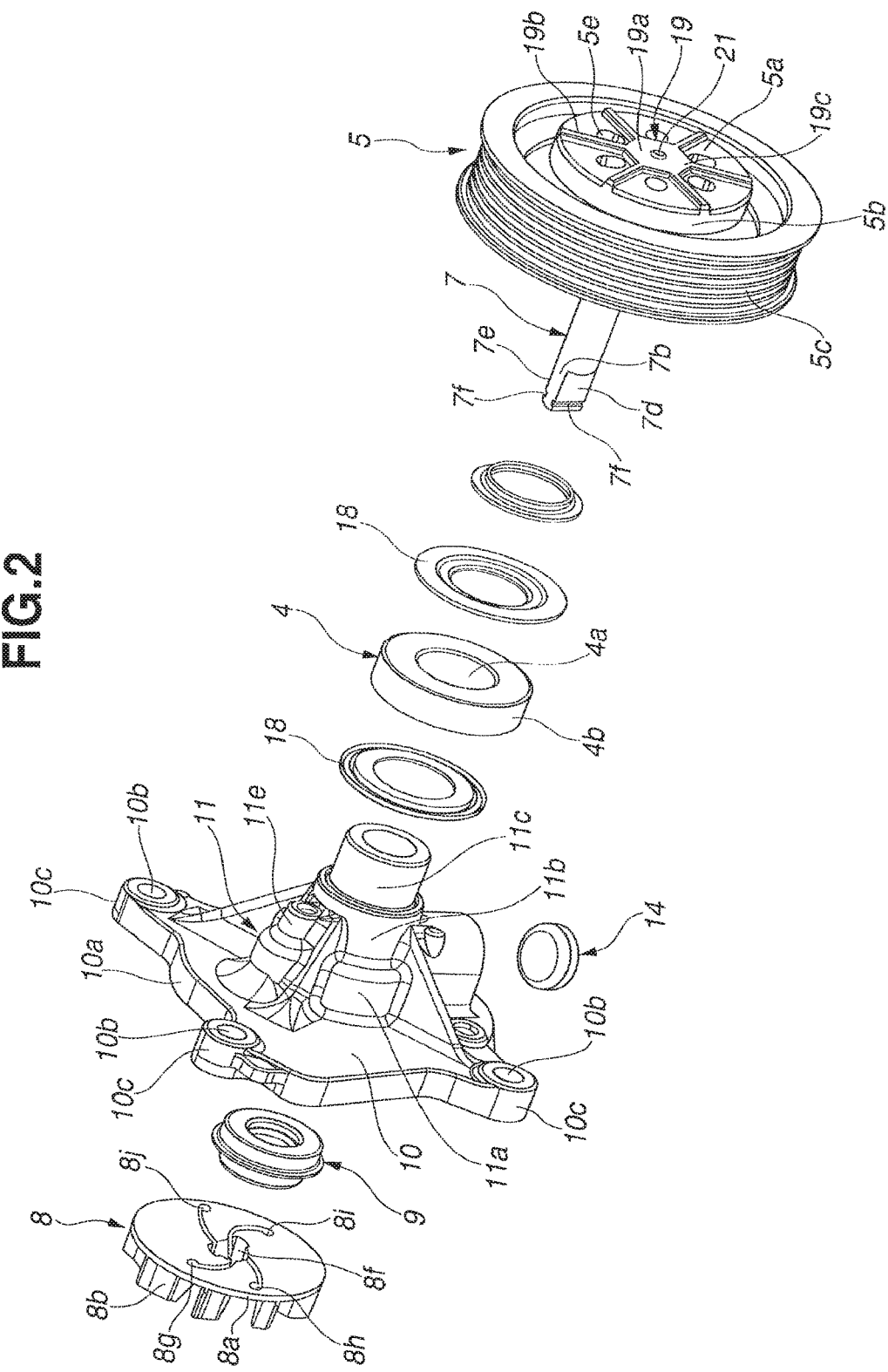
FIG. 2 is an exploded perspective view of the water pump in the first embodiment.
Figure 3:
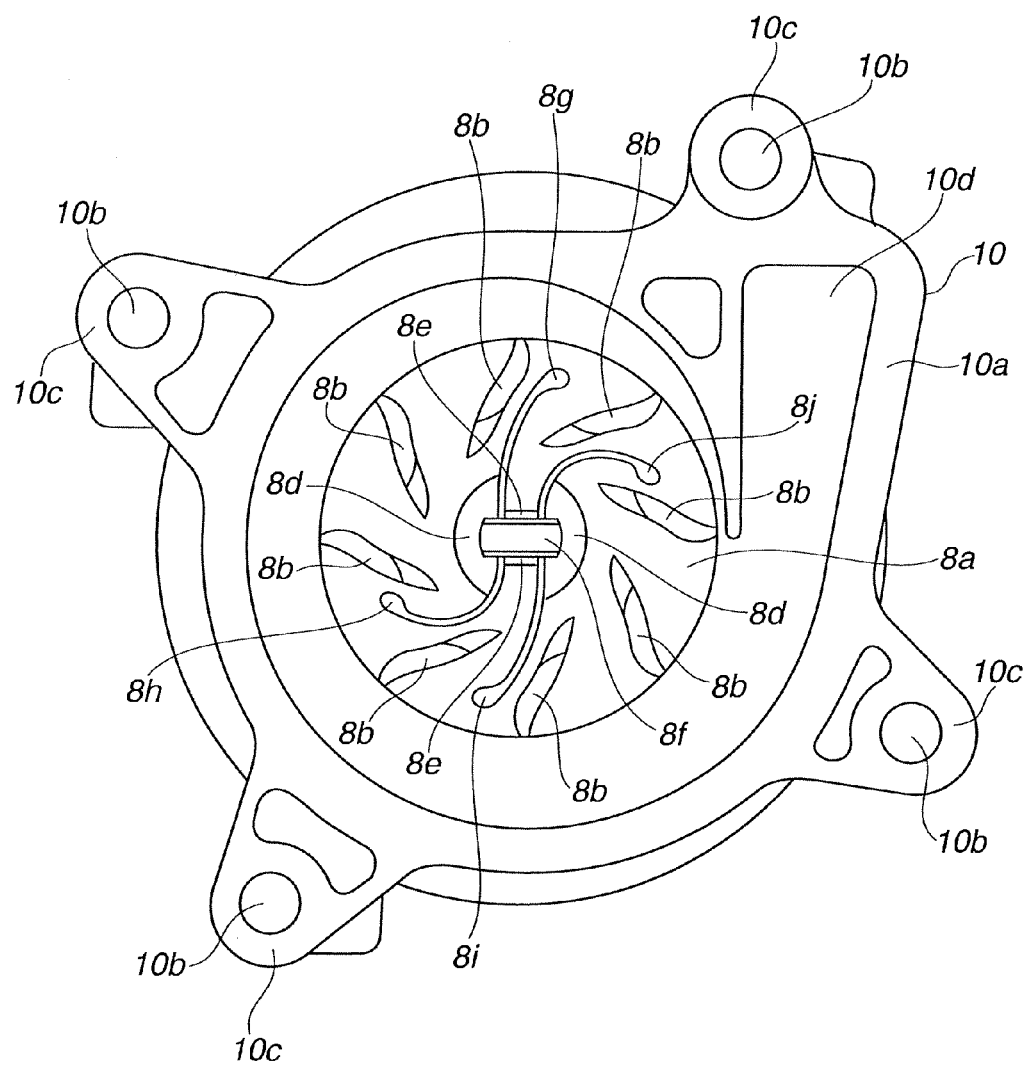
FIG. 3 is a front view of the water pump viewed from an arrow-marked direction from A.

This water pump 1 is directly attached onto a side section of a cylinder block (not shown) of the internal combustion engine by means of bolts. That is so say, as shown in FIGS. 1 and 2, water pump 1 generally includes: a pump housing 2 having a pump chamber 3 provided within a front end of pump housing 2; a pulley 5 rotatably supported by means of a single ball bearing 4 on the front end side of pump housing 2; a metallic insert 6 interposed between pulley 5 and ball bearing 4; a drive shaft 7 inserted into the inside of pump housing 2 and having one end 7*a* integrally molded with pulley 5; an impeller 8 fixed to a small-diameter axle section 7*b* at the other end side of drive shaft 7 and rotatably housed within pump housing 3; and a mechanical seal 9 interposed between pump chamber 3 and ball bearing 4.

Pump housing 2 is integrally molded with an aluminum alloy material, a housing main frame 10 at pump chamber 3 side is formed in a deformed ring shape and a cylindrical section 11 of a stepped diameter shape is integrally formed at the rear end of housing 10.

Housing main frame 10 has a front end formed with a flat annular attachment surface 10*a* contacted on a flat surface section provided on the side section of the cylinder block at the front end section of housing main frame 10. Boss sections 10*c* constituting bolt holes 10*b* are plurally projected on the outer periphery of housing main frame 10. Attachment bolts to be screwed and fixed to the cylinder block are inserted into bolt holes 10*b*.

A discharge port 10*d* is formed to discharge a coolant flowing into pump chamber 3 from a suction port at the radiator side (not shown) into a water jacket of the cylinder block along with the revolution of impeller 8.

Cylindrical section 11, as shown in FIGS. 1 and 2, includes: a large diameter section 11*a* at pump chamber 3 side; a middle diameter section 11*b* extended in the direction of ball bearing 4 from large diameter section 11*a*; and a small diameter section 11*c* extended in the direction of one end section 7*a* of drive shaft 7 from middle diameter section 11*b*.

Middle diameter section 11*b* is provided with a drain hole 12 to fall down water droplets of the coolant leaked mechanical seal 9 in a downward direction of a weight direction is penetrated in a vertical direction. A drain chamber 13 to collect and reserve the droplets from drain hole 12 is formed so as to cross over the inside of large-diameter section 11*a*. Drain chamber 13 has an opening at a downward end thereof which is liquid tightly sealed by means of a drain cap 14.

An atmosphere opening hole 15 is drilled at an upper side in a weight direction of middle diameter section 11*b* in order to externally exhaust water vapor of the coolant reserved within drain chamber 13 or leaked from mechanical seal 9 and drain chamber 13 is formed across an inside of large-diameter section 11*a*. Furthermore, a ring-shaped annular space chamber 16 is formed between an inner peripheral side of middle diameter section 11*b* and drive shaft 7 and this annular space chamber 16 is communicated with drain hole 12 at atmosphere opening hole 15 in the vertical direction. In addition, a cylindrical expansion section 11*e* in a cylindrical shape which forms atmosphere communication hole 17 communicating between atmosphere opening hole 15 and the atmosphere is integrally formed.

Ball bearing 4 is a general matter and, as shown in FIGS. 1 and 2, includes: an inner wheel 4*a* press fitted into small diameter section 11; an outer wheel 4*b* press fitted into insert 6; and a plurality of balls 4*c* rollably disposed via a retainer between inner wheel 4*a* and outer wheel 4*b*.

A maximum press-fit position in the axial direction of inner wheel 4*a* is limited by means of an annular projection 11*f* disposed on a front end edge of middle diameter section 11*b* of cylindrical section 11. In addition, an axial position of outer wheel 4*b* is set in response to the insertion within insert 6 itself by the positioning of inner wheel 4*a*.

A pair of first and second seal members 18, 18 are disposed at front and rear positions of ball bearing 4 to block invasion of dust into the inside of ball bearing 4 and these seal members 18, 18 are face-to-face disposed to cover both sides of ball bearing 4.

Figure 5:
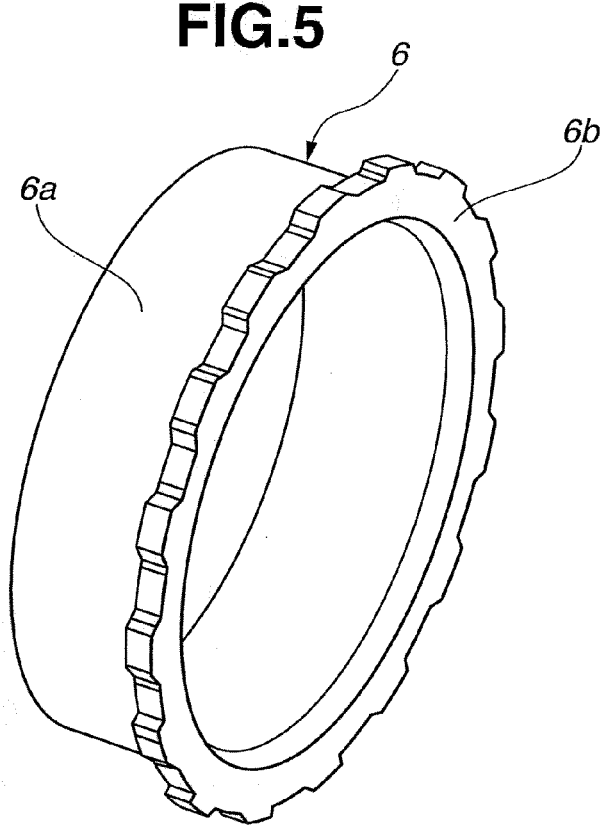
FIG. 5 is a perspective view of an insert used in the first embodiment.
Figure 6:
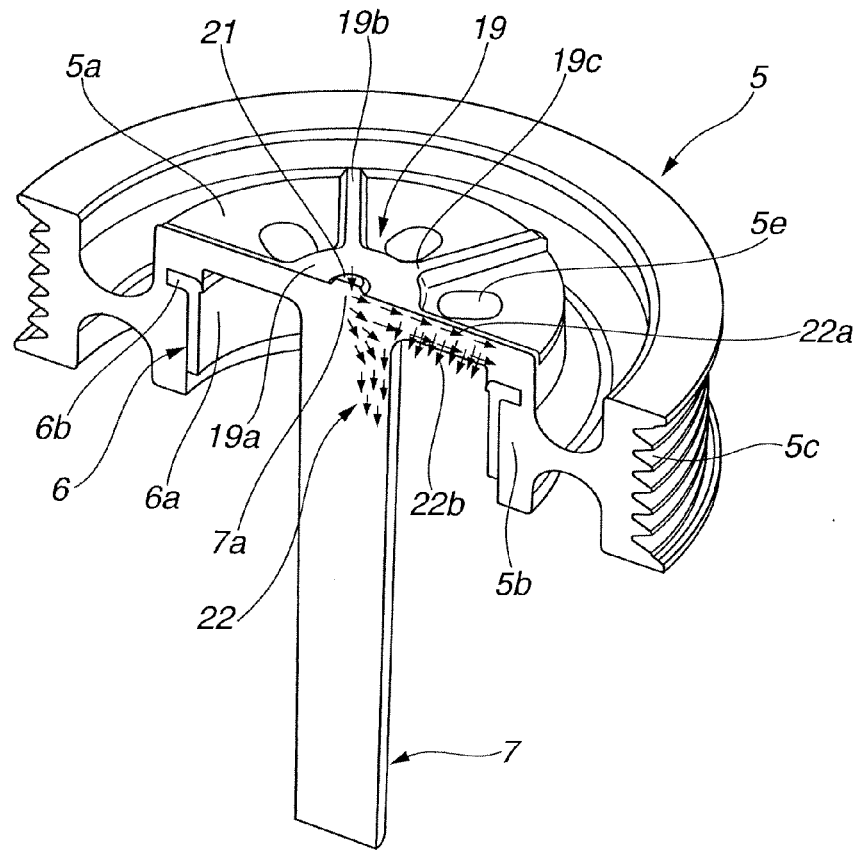
FIG. 6 is a longitudinal cross sectional view of the pulley integrally molded with the drive shaft used in the first embodiment.
Figure 7:
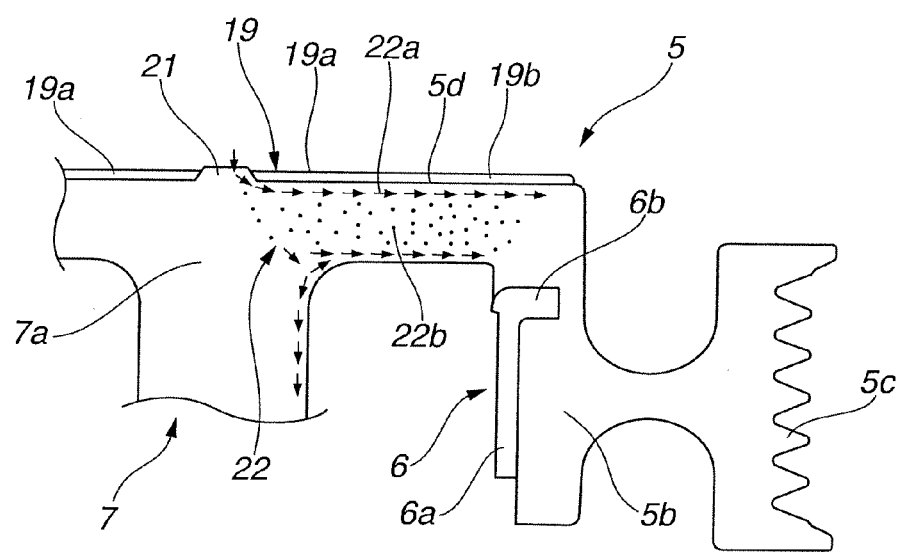
FIG. 7 is an essential cross sectional view of the pulley integrally molded with the drive shaft used in the first embodiment.

Pulley 5 is integrally formed with drive shaft 7 by means of a synthetic resin material mixed with a glass fiber 22 as will be described later as shown in FIGS. 1 and 2 and as shown in FIGS. 5 through 7. Pulley 5 includes: a disc-shaped flange wall (linkage wall) 5*a* extended in the diameter direction of drive shaft 7 from an outer peripheral edge of drive shaft 7; another large-diameter cylindrical section 5*b* bent in the axial direction of drive shaft 7 from the outer peripheral edge of flange wall 5*a* in the axial direction of drive shaft 7; and a belt attachment section 5*c* projected toward the outer peripheral surface of other cylindrical section 5*b*.

Figure 4:
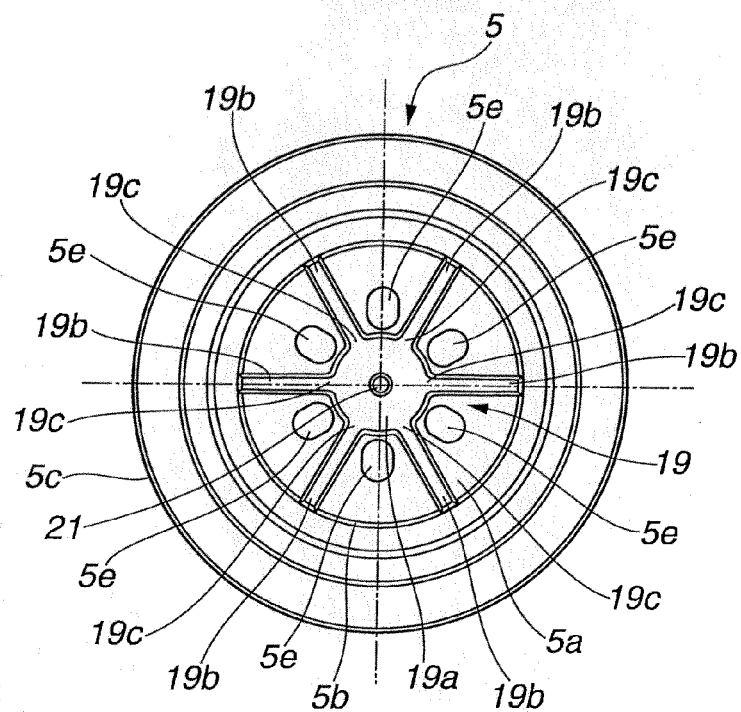
FIG. 4 is a front view of a pulley used in the first embodiment.

Six ellipse penetrating holes 5*e* are drilled at substantially equal interval positions in a circumferential direction at the substantially center position of the diameter direction as shown in FIGS. 1, 2, and 4. These penetrating holes 5*e* serve as working holes through which a press-fit jig (not shown) is inserted and serve to exhaust water vapor externally the water vapor, which has arrived at the inside of small-diameter axial section 11*c* of cylindrical section 11. Hence, each penetrating hole 5*e* is set to a position and a magnitude required for their formation positions and inner diameter serve respective roles.

A reinforcement rib 19 constituted by a plurality of convexity sections in a radial direction of flange wall 5*a* is extended from a substantial center position of the outer surface of pulley 5.

Reinforcement rib 19 includes: a projection section 19*a* formed at the center position toward the radial direction of the outer surface of flange wall 5*a*; and six extension sections 19*b* extended in the radial direction from the outer peripheral edge of projection section 19*a*.

A hexagonal column shape projection section 19*a* is formed at a center of outer surface of flange wall 5*a* and six square sections 19*c* are provided at the outer periphery of projection section 19*a*.

Each extension section 19*b* is interposed between respective penetrating holes 5*e*, extended toward the diameter outer direction from respective square sections 19*c*, and respective lengths of respective extension sections 19*b* are radially extended to the lengths equal to the outer diameter of flange wall 5*a*.

It should be noted that a small diameter salient section 21 is integrally disposed at the center of projection section 19*a*.

This salient section 21 is formed by filling a resin material into a hole installed for the injection of the melt resin material, when pulley 5, drive shaft 7, and reinforcement rib 19 are integrally resin molded through a molding.

Mitute glass fiber 22 is previously mixed within an inside of synthetic resin material which molds pulley 5 and drive shaft 7, as shown in FIGS. 6 and 7. This glass fiber 22 is injected into a mold during the injection molding together with the synthetic resin material. At the time of molding, this glass fiber 22 is injected into the mold at the time of injection molding together with the synthetic resin material. At the time of molding, glass fiber 22 is radially oriented toward a radial direction from projection 21 (injection outlet) as shown by the arrow in FIGS. 6 and 7 in inside of the outer surface side of reinforcement rib 19 contacted against the mold and in the inside of outer surface side and inner surface side of flange wall 5a, as shown in FIGS. 6 and 7.

On the other hand, glass fiber 22b at the inside of flange wall 5a which is not contacted with the above-described mold is oriented in a direction orthogonal to a circumferential direction of flange wall 5a.

That is to say, glass fiber 22 is radially oriented toward a radial end direction of flange wall 5a from salient section 21 (injection inlet) so as to be along with surfaces of reinforcement rib 19 and flange wall 5a.

The other cylindrical section 5b is integrally formed with insert 6 formed by a cylindrical metal at an inner peripheral surface side as shown in FIGS. 1, 6, and 7.

This insert 6 is, as shown in FIG. 5, constituted by a cylindrical main frame 6a and a flange section 6b integrally formed at a tip of main frame 6a of insert 6. Flange section 6b is buried into other cylindrical section 5b at the time of resin molding of pulley 5 to be integrally formed with pulley 5.

Main frame 6a of insert 6 has an axial length slightly longer than the axial length of outer wheel 4b and the inner diameter is slightly largely formed to be smaller than outer diameter of outer wheel 4b, with the pressure margin taken into consideration. Then, after the forming, outer wheel 4b of ball bearing 4 is press fitted onto the inner peripheral surface of insert 6.

Flange section 6b has an outer peripheral surface formed in an outer saw tooth waveform shape, limits a racing of insert 6 on an inner periphery of other cylindrical section 5b, and suppresses a drop-out of insert 6 from the inner periphery of other cylindrical section 5b.

Belt attachment section 5c has the outer periphery formed in a saw-tooth waveform configuration which is wound by means of a transmission belt wound on a drive pulley fixed to a tip of the crankshaft not shown so that a rotational force is transmitted.

Drive shaft 7 is formed of a synthetic resin material combined with glass fiber 22, as shown in FIGS. 1 and 2, and one end section 7a is integrally coupled with pulley 5 and the other end section has a small-diameter axle section 7b formed at the other end section and a circular groove 7c cut out annularly at the substantial center position of drive shaft 7.

Figure 8:
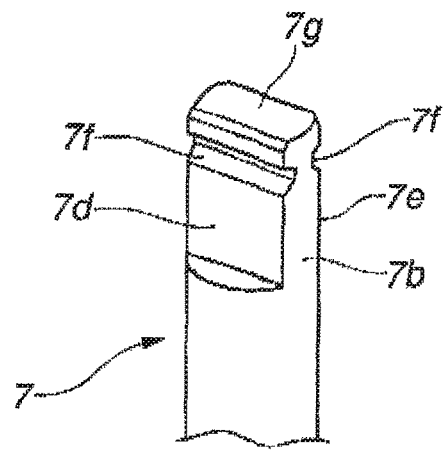
FIG. 8 is a perspective view of the pulley integrally molded with the drive shaft used in the first embodiment.
Figure 9:
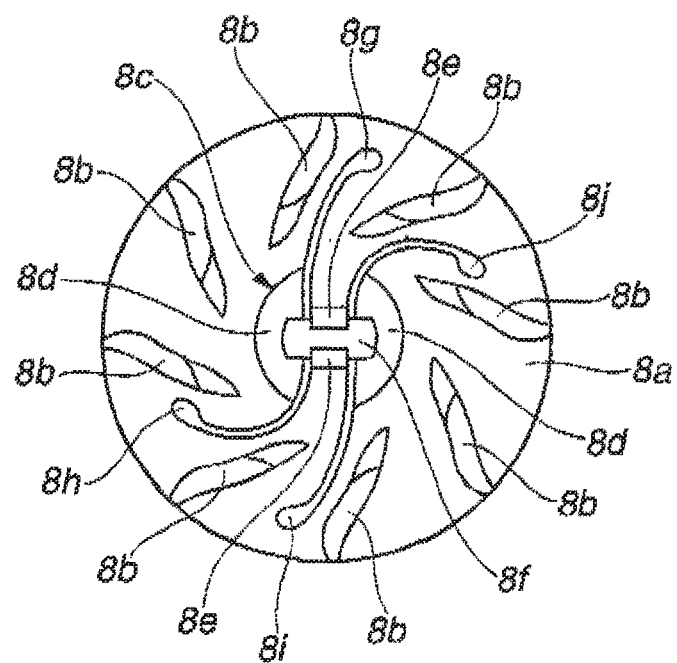
FIG. 9 is a front view of an impeller used in the first embodiment.
Figure 10:
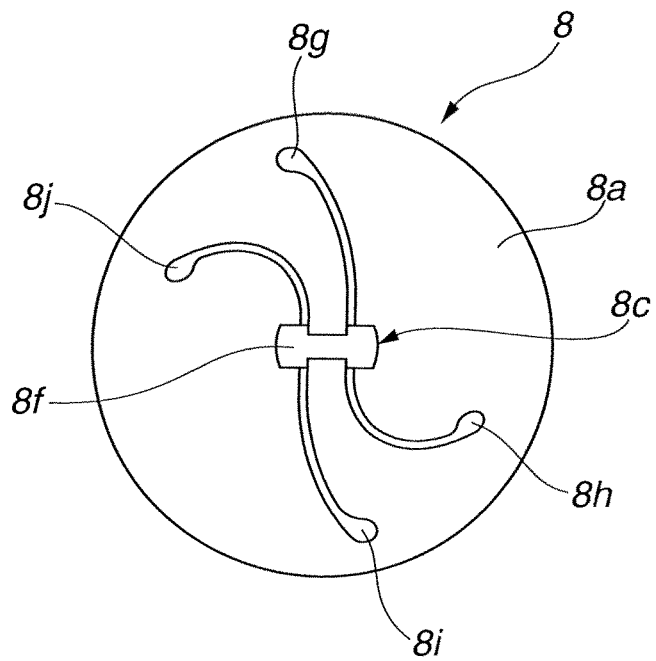
FIG. 10 is a rear view of the impeller used in the first embodiment.
Figure 11:
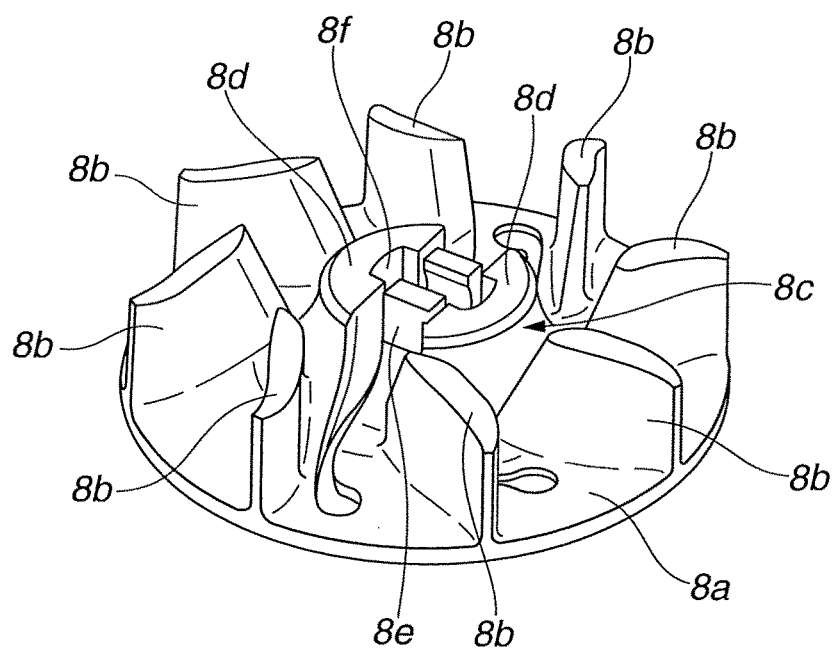
FIG. 11 is a perspective view of the impeller used in the first embodiment.

Small-diameter axle section 7b is formed in a width across flat shape as shown in FIGS. 1, 2, and 8. Engagement grooves 7f, 7f which are an engagement section of drive shaft 7 at the tip end sides of parallel both side surfaces 7d, 7e are radially formed. Both engagement grooves 7f, 7f are formed substantially in a rectangular shape in cross section having a predetermined depth. A tip end section 7g is in a projective fashion by means of this engagement grooves 7f, 7f and formed in a flat surface rectangular shape.

Annular groove 7c is disposed at a position exposed to annular space chamber 16. It should be noted that a reservoir chamber (not shown) which reserves water blocked by means of mechanical seal 9 is formed at a lower section of annular space chamber 16. This reservoir chamber (not shown) is closed by means of a drain cap 14.

Impeller 8 is formed integrally by means of the synthetic resin material. As shown in FIGS. 1, 2, and 9 through 11, impeller 8 includes: a substantially disc-shaped base section 8a; eight fan sections 8b formed radially from the center section side to the front surface peripheral surface of base section 8a; and a seizure section 8c projected integrally in the axial direction at the center section which is a rotational center of base section 8a and seized on small-diameter axle section 7b of drive shaft 7.

Base section 8a is formed with a predetermined wall thickness and is rotated with a gap on the rear surface of pump chamber 3 with the gap.

Engagement section 8c includes: a pair of cylindrical sections 8d, 8d in a half division shape and through which small diameter axle section 7b of drive shaft 7 is inserted in the inner axial direction; and a pair of seizure pawls 8e, 8e disposed between circumferential opposing surfaces of respective cylindrical sections 8d, 8d to be seized by means of respective engagement grooves 7f, 7f of small-diameter axle section 7b.

Cylindrically shaped sections 5d, 5d are projected from a front surface center of base section 5a and a projection quantity thereof is set to be shorter than that of a wing section 5b. In addition, an inserting hole 5f having a cross sectional area of rectangular shape is penetrated which inserts small-diameter axle section 7b in the inner axial direction mutually opposite together.

Each of pair of engagement pawls 8e, 8e is formed in an elongated rectangular plate shape and stands in face to face with each other mutually via a constant gap. The base end section thereof is integrally raised from base section 8a and is elastically deformably formed in an expansion-and-shrinkage direction with base section 8a as a fulcrum.

A width of the gap between engagement pawls 8e, 8e is set to be slightly larger than a length of a width of small diameter axle section 7b and both side surfaces 7d, 7e of small diameter axle section 7b of drive shaft 7 are slidably contacted and inserted into respective inner surfaces of engagement pawls 8e, 8e. In addition, engagement pawls 8e, 8e are similarly formed with respective engagement grooves 7f, 7f of small diameter axle section 7b in an analogous form and are engaged on respective engagement grooves 7f, 7f according to an elastic recovering force of engagement pawls 8e, 8e. Thus, impeller 8 is integrally rotated with drive shaft 7.

Four slit sections 8g, 8h, 8i, 8j are formed from a rotation center section of four slit sections toward respective both side surfaces of respective engagement pawls 8e, 8e toward the outer peripheral sides from the rotation center side and penetrated from the front surface of base section 8a and the rear surface thereof.

Mechanical seal 9 is of general nature and is constituted by a cartridge section 9a fixed on the inner peripheral surface of middle diameter section 11b of cylindrical section 11; a sleeve section 9b supported on an outer peripheral side of drive shaft 7; and a seal section 9c installed and slid between the inner peripheral side of cartridge section 9a and the outer peripheral side of sleeve section 9b.

[Action and Advantage of First Embodiment]

Hence, in the first embodiment, the crankshaft of the engine is rotationally driven so that pulley 5 is rotationally driven. At this time, impeller 8 is rotated via drive shaft 7 integrally molded with pulley 5 to perform the pump action. The coolant is supplied from discharge port 10d to a water jacket of the engine under pressure to perform the cooling of the internal combustion engine.

Then, in this embodiment, reinforcement rib 19 having projection section 19a at the outer surface of flange wall 5a of pulley 5 and extension sections 19b is disposed on the outer surface of flange wall 5a of pulley 5 so that a stress concentration toward the radial direction of pulley 5 is suppressed even if the thermal shock at the time of the durability test is applied to the water pump and the generation of the cracks due to the expansion-and-shrinkage of such parts of water pump 1 can be reduced.

That is to say, reinforcement rib 19 reinforces a radial stress concentration against a radial deformation of flange wall 5a due to an excessive thermal load at the time of the thermal shock test, suppresses the radial stress concentration, and suppresses the generation of the cracks.

In addition, since glass fiber 22a is oriented in the radial direction from salient section 21 between an inside of the outer surface of reinforcement rib 19 and the inside of outer surface side of flange wall 5a, not only the strength of flange wall 5a but also the strength of reinforcement rib 19 can be improved. Consequently, since there are many portions such that the orientation of glass fiber 22 is the radial direction of flange wall 5a. Thus, the generation of the cracks of flange wall 5a can furthermore effectively be suppressed.

In a case where an insert molding in which a metallic insert 6 is formed in the inside of pulley 7 of synthetic resin, high temperature resin is caused to flow into the metallic mold. When the resin is cooled and shrunk, metallic insert 6 provides a wall and the radial side of metallic insert 6 is shrinkage suppressed and the inner side is not suppressed. Therefore, there is a possibility that a relatively large tensile stress is left in a radial inside of metallic insert 6. At this time, in this embodiment, a radial strength of flange wall 5a is improved so that the shrinkage toward the inside of the radial metallic insert is suppressed and the residue of the tensile stress of flange wall 5a can be suppressed.

Slit sections 8g, 8h, 8i, 8j formed on impeller 8 actively cools sleeve section 9b of mechanical seal 9 by means of the coolant caused to flow in the direction of mechanical seal 9 so that a baking caused by a slide friction of sleeve section 9b with drive shaft 7 can effectively be suppressed.

Major part of the coolant caused to flow into impeller 8 is blocked from flowing into middle diameter section 11b of drive shaft 7 by means of mechanical seal 9. Part of the coolant is, for example, leaked from sliding seal section 9c of mechanical seal 9 so as to flow along an outer peripheral surface of drive shaft 7 and is caused to flow in the direction of circular groove 7c. The flowing coolant arrives at the direction of circular groove 7c. At this time, the coolant is cut out on an outer peripheral edge of a stepwise difference surface of circular groove 7c along with a revolution centrifugal force of drive shaft 7 and individually collected and reserved into drain chamber 13 from drain hole 12.

Second Embodiment

Figure 12:
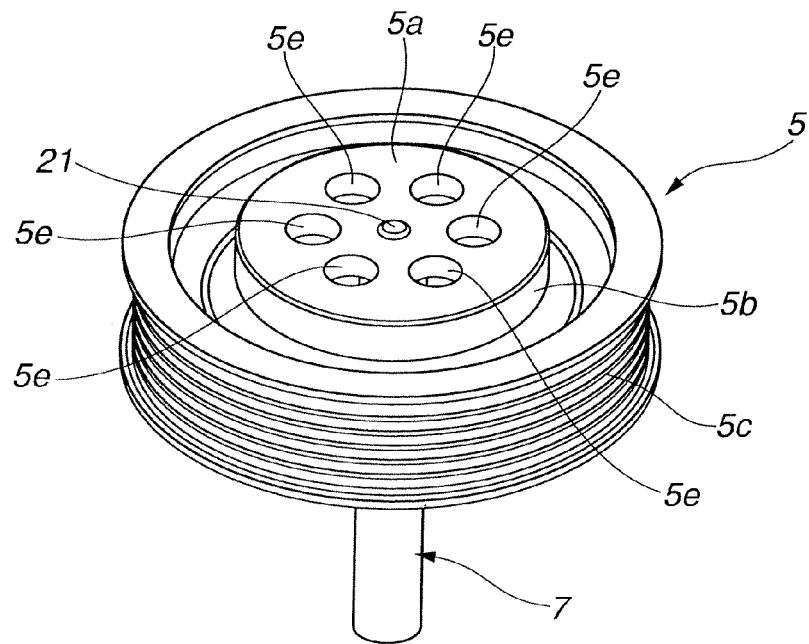
FIG. 12 is a front perspective view representing a second preferred embodiment of the water pump according to the present invention.
Figure 13:
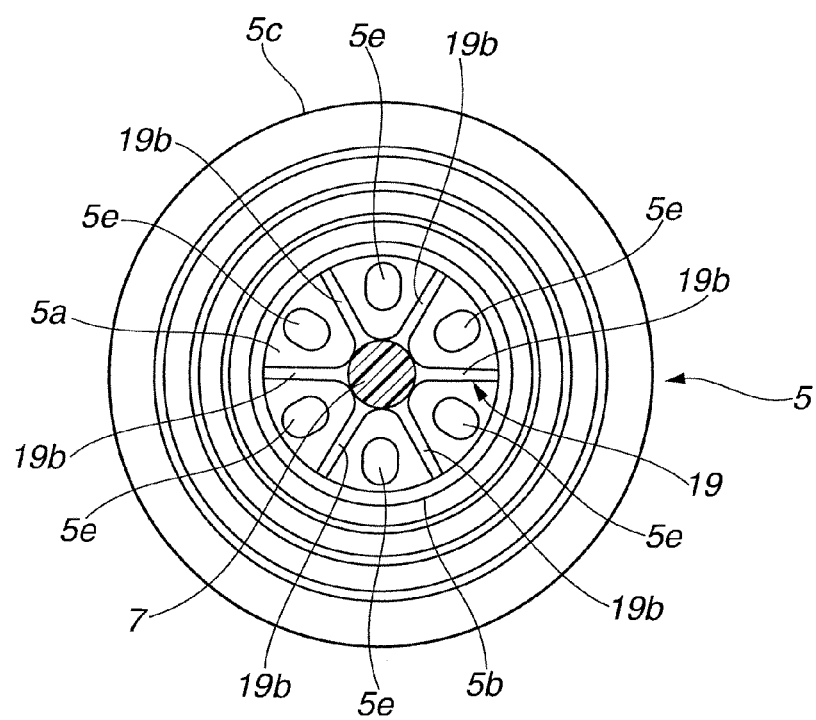
FIG. 13 is a rear view of the pulley integrally molded with the drive shaft in the second embodiment.

FIGS. 12 and 13 show a second preferred embodiment of the water pump. Reinforcement rib 19 is integrally molded on an inner surface of pulley 5. That is to say, reinforcement rib 19 is constituted by six extension sections 19b integrally molded on the inner surface of flange wall 5a. Each extension section 19b is disposed between respective penetrating holes 5e and each inner end edge is coupled to the outer peripheral surface of drive shaft 7 and extended in the radial direction from the outer periphery of drive shaft 7 and each outer end edge is extended up to the same length as the outer diameter of flange wall 5a.

Hence, in this embodiment, reinforcement rib 19 is integrally molded on the inner surface of flange wall 5a of pulley 5. Thus, the stress concentration in the circumferential direction at the time of thermal load test is suppressed and the generation of cracks due to the expansion and shrinkage can be reduced.

That is to say, since each extension section 19b reinforces flange wall 5a from a right angle direction with respect to the deformation in the circumferential direction due to excessive thermal load at the time of the thermal shock test, the stress concentration in the circumferential direction of flange wall 5a is suppressed and the generation of cracks is effectively suppressed.

Furthermore, glass fiber 22a is radially oriented from the outer periphery of drive shaft 7 along the metallic mold. Thus, the strength of reinforcement rib 19 can be raised.

In addition, reinforcement rib 19 is disposed along the inner surface side of flange wall 5a. Thus, the flow of air is reduced and the generation of an abnormal sound can be suppressed.

It should be noted that the other structures are the same as those in the first embodiment and the same effects as described in the first embodiment can be achieved.

Third Embodiment

Figure 14:
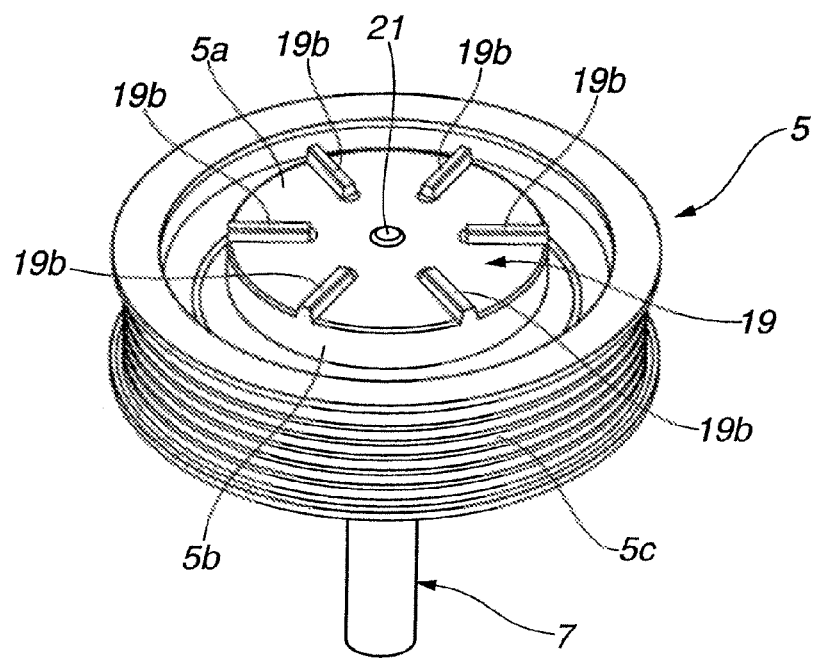
FIG. 14 is a front perspective view representing a third preferred embodiment of the water pump according to the present invention.

FIG. 14 shows a third preferred embodiment of water pump 1. Salient section 19a of reinforcement rib 19 in the first embodiment is eliminated (omitted) and reinforcement rib 19 is constituted merely by remaining six respective extension sections 19b.

In addition, penetrating holes 5e drilled on the outer surface of flange wall 5a are eliminated (omitted).

Hence, in this embodiment, each extension section 19b is integrally molded on the flange outer surface 5a of pulley 5. The right angular directional reinforcement with respect to the deformation in the circumferential direction of flange wall 5a so that the stress concentration in the circumferential direction is suppressed and the generation of cracks can be suppressed.

Furthermore, glass fiber 22 is radially oriented from salient section 21 along the mold in the inside of the outer surface of each extension section 19b. Hence, the strength of each extension section 19b can be raised.

The other structures are the same as those described in the first embodiment and, hence, the same advantages as the first embodiment can be obtained.

Fourth Embodiment

Figure 15:
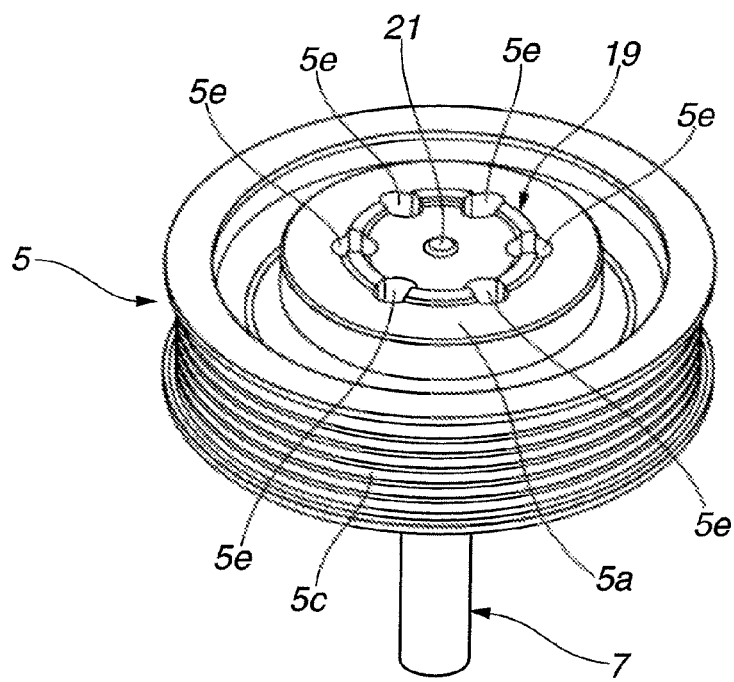
FIG. 15 is a front perspective view representing a fourth preferred embodiment of the water pump according to the present invention.

FIG. 15 shows a fourth preferred embodiment of the water pump. In this embodiment, reinforcement rib 19 is integrally molded along a circumferential direction among six penetrating (through) holes 5e mounted on flange wall 5a.

That is to say, reinforcement rib 19 is disposed on the outer surface of flange wall 5a so as to link each penetrating hole 5e and is formed in a ring shape projected slightly from the outer surface of flange wall 5a. As described above, each penetrating hole 5e is linked in the circumferential direction so that the circumferential intervals of penetrating holes 5e in which the cracks are easy to be generated can directly be reinforced. Thus, the strength of flange wall 5a can be increased.

Hence, since reinforcement rib 19 itself is increased, the further decrease of the generation of flange wall 5a can be reduced.

In addition, since the other structure is the same as the first embodiment, the same advantages as described in the first embodiment can be achieved.

Fifth Embodiment

Figure 16:
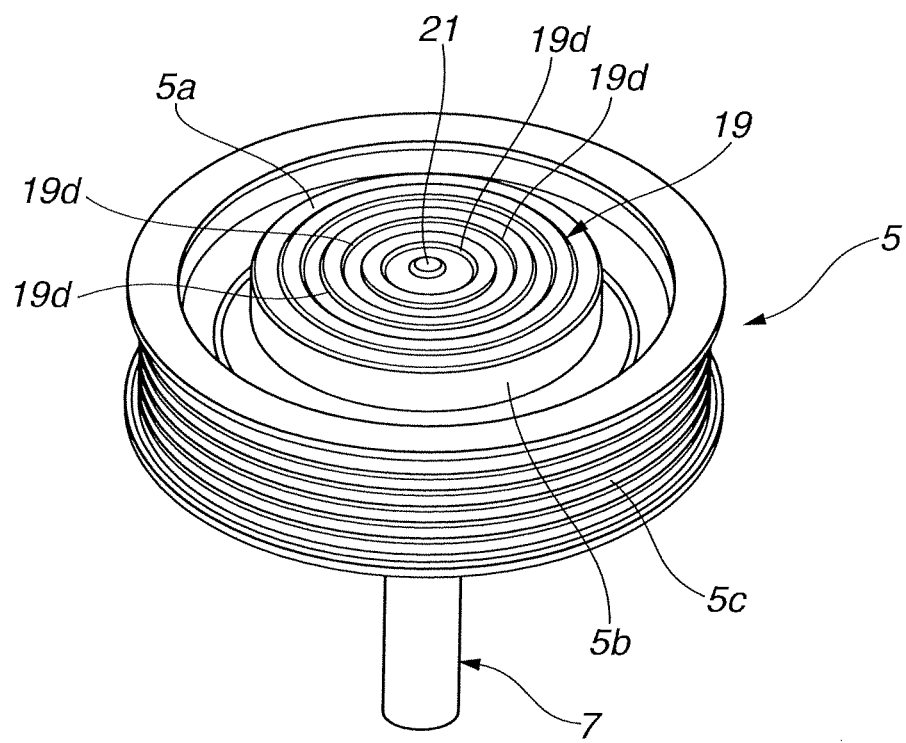
FIG. 16 is a front perspective view representing a fifth preferred embodiment of the water pump according to the present invention.

FIG. 16 shows a fifth preferred embodiment of the water pump.

In this embodiment, a plurality of ripple shaped reinforcement ribs 19 (19d) are integrally formed in the circumferential direction of the outer surface of flange wall 5a.

Reinforcement ribs 19d in this embodiment are plurally formed concentrically and in the ripple shape from the center of the outer surface of flange wall 5a.

That is to say, in this embodiment, ripple shaped multiple reinforcement ribs 19d in the circumferential direction of flange wall 5a are integrally formed with pulley 5 and drive shaft 7. Thus, the improvement in the peripheral directional strength can be achieved.

Glass fiber 22a is radially oriented from salient section 21 along the outer surface of flange wall 5a. Therefore, flange wall 5a and the strength of reinforcement rib 19 itself can be increased.

Hence, since strength of reinforcement rib 19 is raised, the generation of cracks along the peripheral direction can furthermore be reduced.

In addition, the other structures are the same as those described in the first embodiment. Hence, the same advantages as those in the first embodiment can be obtained.

The present invention is not limited to the structures of the respective embodiments and various changes and modifications may be made without departing from the scope of the present invention defined in the appended claims.

The technical ideas of the present invention graspable from the above-described embodiments other than the claims 1, 2, and 3 will be described below.

(a) The water pump as set forth in claim 1, wherein the metallic member is integrally fixed to the pulley when the pulley is molded.

(b) The water pump as set forth in item (a), wherein the metallic member is a cylindrically formed metallic insert.

According to the present invention, the metallic member is an easy configuration as the attachment section of the ring-shaped outer wheel.

(c) The water pump as set forth in claim 1, wherein the flange wall is formed in the disc shape toward a radial direction of the drive shaft from the one end section of the drive shaft which is opposite to the impeller.

(d) The water pump as set forth in claim 1, wherein the reinforcement rib is installed on an outer surface of the flange wall which is located at an opposite side of the impeller.

(e) The water pump as set forth in claim 1, wherein the reinforcement rib is disposed on an inner surface of the flange wall which is located toward the impeller with respect to the outer surface of the flange wall.

Since the reinforcement rib is mounted on the inner surface side of the flange wall according to the present invention, the air movement at the time of drive is less and abnormal sound becomes difficult to be generated.

(f) The water pump as claimed in claim 1, wherein the reinforcement rib comprises at least one projection section projected from the outer surface of the flange wall and radially disposed toward an outer direction from an inner side of a diameter direction of the pulley.

(g) The water pump as set forth in item (f), wherein the projection section comprises a plurality of projection sections and whose thicknesses are different from each other.

(h) The water pump as set forth in claim 1, wherein the projection section has a thickness varied from an inside of the diameter direction toward the outside of the diameter direction.

(i) The water pump as claimed in claim 1, wherein the projection section is disposed and divided into a plurality of projection sections.

(j) The water pump as claimed in claim 2, wherein the reinforcement rib comprises at least one rib disposed in a concentric shape from a rotation center of the drive shaft.

According to the present invention, when a to required strength is obtained, it is not necessary to install the reinforcement rib on a whole region. Thus, an improvement of the cost can be made.

(k) The water pump as claimed in claim 2, wherein the reinforcement rib comprises at least one rib disposed on a concentric circle from a rotation center of the drive shaft.

According to the present invention, the reinforcement with respect to the shrinkage deformation in the circumferential direction can be achieved.

(m) The water pump as set forth in item (k), wherein the reinforcement rib comprises a plurality of ribs whose thicknesses are different from one another.

According to the present invention, the thickness of the reinforcement rib in accordance with the degree of expansion or shrinkage can arbitrarily be set so that the strength can be increased.

(m) The water pump as set forth in claim 1, wherein an injection inlet during the molding of the pulley is located at a center of the flange wall.

According to the present invention, glass fiber is injected from the center of the flange wall. Thus, the orientation of the glass fiber is oriented to be followed from the center toward the outer side. Thus, the strength of the flange wall is increased.

(n) The water pump as set forth in claim 1, wherein the flange wall includes at least one penetrated hole in an axial direction of the drive shaft.

According to the present invention, the exhaust of water vapor in the inside of the water pump becomes possible. However, since the penetrating hole is present, the strength is reduced and the advantage of the reinforcement rib becomes important.

(o) The water pump as claimed in claim 17, wherein the penetrated hole is installed in an ellipse shape.

According to the present invention, the size of the hole can be taken while the reinforcement rib is provided.

(p) The water pump as set forth in claim 18, wherein the reinforcement rib is interposed between a plurality of the penetrated holes.

According to the present invention, since the strength of portions among the penetrated holes is improved so that the peripheral directional stress concentration can be suppressed.

This application is based on a prior Japanese Patent Application No. 2012-188240 filed in Japan on Aug. 29, 2012. The entire contents of this Japanese Patent Application No. 2012-188240 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A water pump, comprising:
  a rotatably disposed impeller;
  a pump housing having a pump chamber housing the impeller and a cylindrical section continued on the pump chamber;
  a drive shaft rotatably inserted into the cylindrical section, one end section of the drive shaft being projected from the cylindrical section, and the impeller being disposed on the other end section of the drive shaft;
  a flange wall extended in a radial direction from the one end section of the drive shaft;
  a pulley having another cylindrical section disposed on an outer periphery of the cylindrical section and formed continuously with the outer periphery of the flange wall, and a belt attachment section projected in the radial direction from the outer periphery of the other cylindrical section;
  a metallic member fixed to an inner peripheral surface of the other cylindrical section; and
  a bearing intervened between the metallic member and an outer peripheral surface of the cylindrical section of the pump housing to rotatably hold the pulley;
  wherein the drive shaft and the pulley are integrally formed with a synthetic resin material in which glass fiber is contained, and, on the flange wall, a plurality of reinforcement ribs are installed and radially extended between a center section and the other cylindrical section, and
  wherein the glass fiber is radially oriented toward a radial end direction of the flange wall.

2. The water pump as claimed in claim 1, wherein the reinforcement ribs contain the glass fiber within inner sides of the reinforcement ribs, the glass fiber having one glass fiber and another glass fiber, the one glass fiber and the other glass fiber being perpendicular to each other in the inner sides of the reinforcement ribs.

3. The water pump as claimed in claim 1, wherein the metallic member includes:
  a cylindrical main frame; and
  a flange section formed at a tip of the cylindrical main frame and buried in the other cylindrical section of the pulley.

4. The water pump as claimed in claim 3, wherein the metallic member is cylindrically formed.

5. The water pump as claimed in claim 1, wherein the flange wall is formed in a disc shape toward a radial direction of the drive shaft from the one end section of the drive shaft which is opposite to the impeller.

6. The water pump as claimed in claim 1, wherein the reinforcement ribs are installed on an outer surface of the flange wall, the outer surface of the flange wall being located at an opposite side of the impeller.

7. The water pump as claimed in claim 1, wherein the reinforcement ribs are disposed on an inner surface of the flange wall, the inner surface of the flange wall being located toward an impeller side.

8. The water pump as claimed in claim 1, wherein the reinforcement ribs comprise convexity sections projected radially from an inner side of a diameter direction of the pulley in the flange wall toward an outside of the diameter direction.

9. The water pump as claimed in claim 1, wherein an injection inlet during a molding of the pulley is located at a center of the flange wall.

10. The water pump as claimed in claim 1, wherein the flange wall includes at least one penetrated hole in an axial direction of the drive shaft.

11. The water pump as claimed in claim 10, wherein the penetrated hole is installed in an ellipse shape.

12. The water pump as claimed in claim 11, wherein the reinforcement ribs are interposed between a plurality of the penetrated holes.

13. The water pump as claimed in claim 1, wherein an axially projected projection section is installed at a radial direction center position of the flange wall and the plurality of reinforcement ribs are radially extended toward the outer direction from an outer peripheral edge of the projection section.

* * * * *